(12) United States Patent
Suzuki et al.

(10) Patent No.: US 10,428,696 B2
(45) Date of Patent: Oct. 1, 2019

(54) ELECTROMAGNETIC ACTUATOR HAVING CLAMPING-FREE TAPPETS

(71) Applicant: KENDRION (Villingen) GmbH, Villingen-Schwenningen (DE)

(72) Inventors: Tsuneo Suzuki, Moenchweiler (DE); Harald Burkart, Villingen-Schwenningen (DE); Wolfram Maiwald, Villingen-Schwenningen (DE); Pedro Marull-Kessler, Moenchweiler (DE); Michael Tischtschenko, Trossingen (DE); Martin Schuetz, Brigachtal (DE)

(*) Notice: Subject to any disclaimer, the term of this patent is extended or adjusted under 35 U.S.C. 154(b) by 0 days.

(21) Appl. No.: 15/548,355

(22) PCT Filed: Apr. 4, 2016

(86) PCT No.: PCT/EP2016/057347
§ 371 (c)(1),
(2) Date: Aug. 2, 2017

(87) PCT Pub. No.: WO2016/162306
PCT Pub. Date: Oct. 13, 2016

(65) Prior Publication Data
US 2018/0016949 A1    Jan. 18, 2018

(30) Foreign Application Priority Data
Apr. 8, 2015  (DE) ........................ 10 2015 105 337

(51) Int. Cl.
*F01L 1/14* (2006.01)
*F01L 1/053* (2006.01)
(Continued)

(52) U.S. Cl.
CPC ................. *F01L 1/14* (2013.01); *F01L 1/053* (2013.01); *F01L 13/0036* (2013.01);
(Continued)

(58) Field of Classification Search
CPC .. F01L 1/14; F01L 13/0036; F01L 2013/0052
(Continued)

(56) References Cited

U.S. PATENT DOCUMENTS 8,899,198 B2 * 12/2014 Hoppe .................... F01L 1/344
123/90.17

FOREIGN PATENT DOCUMENTS

DE    100 55 948 A1    5/2002
DE    102 40 774 A1    4/2003
(Continued)

OTHER PUBLICATIONS

International Search Report for related application PCT/EP2016/057347, dated Jul. 8, 2016.
(Continued)

*Primary Examiner* — Ching Chang
(74) *Attorney, Agent, or Firm* — Juneau & Mitchell

(57) ABSTRACT

The invention is an actuator device comprising a first and a second tappet, wherein the first tappet is movably arranged in a first guide sleeve and the second tappet is movably arranged in a second guide sleeve, wherein the first tappet in the first guide sleeve is surrounded by a first restoring spring and the second tappet in the second guide sleeve is surrounded by a second restoring spring, and wherein the guide sleeves are arranged at a fixed distance from each other, wherein the first restoring spring is a coil spring wound in the left-hand direction and the second restoring spring is a coil spring wound in the right-hand direction.

15 Claims, 1 Drawing Sheet

(51) Int. Cl.
  *F01L 13/00*    (2006.01)
  *F16F 1/366*    (2006.01)
  *F01L 1/047*    (2006.01)
  *F01L 9/04*     (2006.01)

(52) U.S. Cl.
  CPC ............. *F16F 1/3665* (2013.01); *F01L 1/047* (2013.01); *F01L 9/04* (2013.01); *F01L 2013/0052* (2013.01); *F16F 2224/0241* (2013.01)

(58) Field of Classification Search
  USPC ................................ 123/90.48, 90.52, 90.55
  See application file for complete search history.

(56)           References Cited

FOREIGN PATENT DOCUMENTS

| | | |
|---|---|---|
| DE | 10 2007 078 525 A1 | 11/2008 |
| DE | 10 2008 029324 A1 | 12/2009 |
| DE | 10 2010 024030 A1 | 12/2011 |
| DE | 10 2011 078525 A1 | 1/2013 |
| EP | 1 352 794 A2 | 10/2003 |
| WO | WO 01/69613 A1 | 9/2001 |

OTHER PUBLICATIONS

GPTO office action for related patent application 10 2015 105 337.3, dated Mar. 15, 2016.

\* cited by examiner

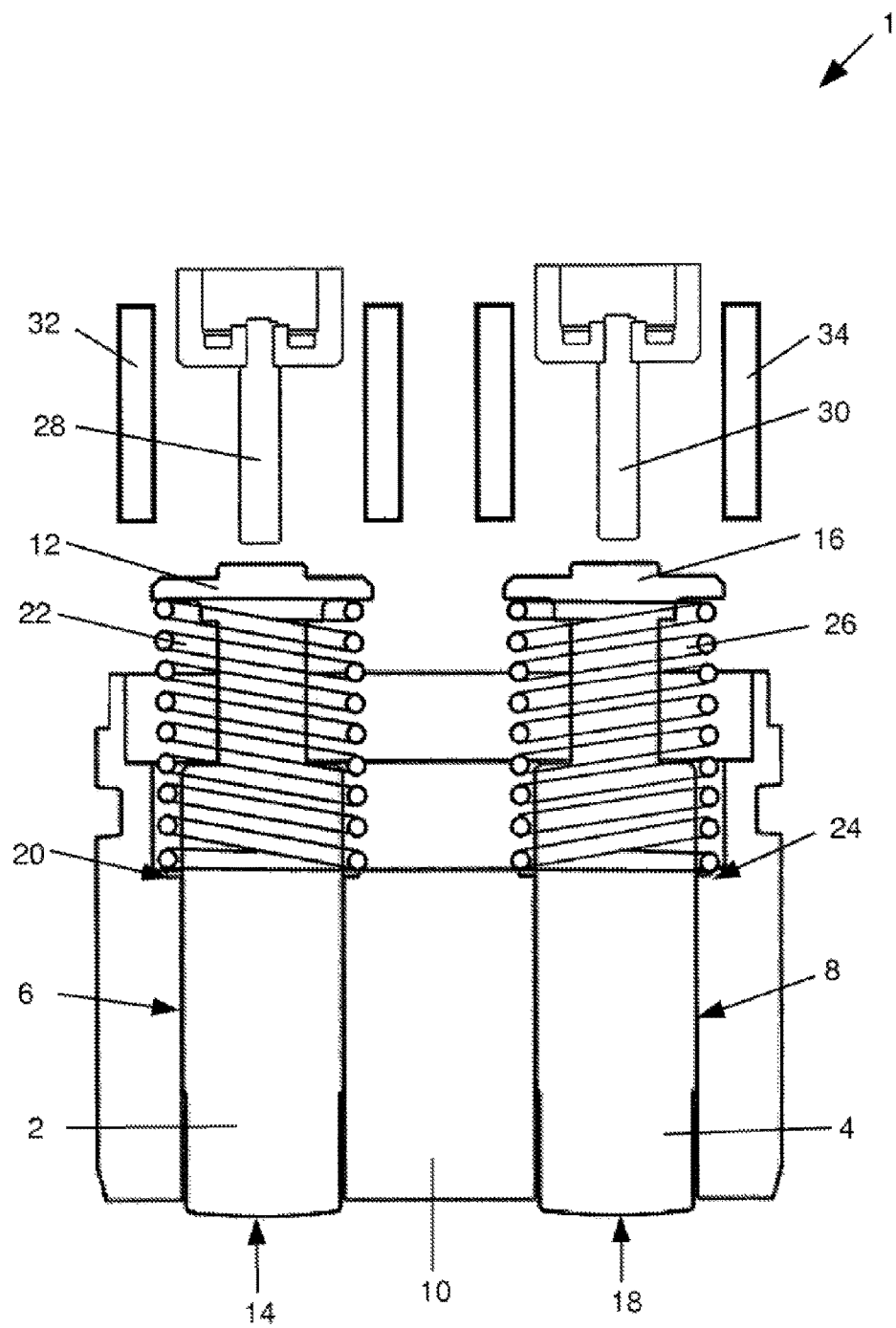

ELECTROMAGNETIC ACTUATOR HAVING CLAMPING-FREE TAPPETS

CROSS REFERENCE TO RELATED APPLICATIONS

This patent application claims priority to International Patent Application PCT/EP2016/057347, filed on Apr. 4, 2016, and to German Patent Application 10 2015 105 337.3, filed on Apr. 8, 2015.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to field device with an electromagnetic actuator having clamping-free tappets.

Background of the Invention

The present invention is an actuator device, for example an actuator device for motor vehicles, as well as a motor vehicle comprising such an actuator device. In particular, the invention relates to an actuator device for changing the valve opening and/or the valve opening times of internal combustion engines and/or the actuator device for partially shutting off cylinders of internal combustion engines.

Actuator devices, particularly actuator devices with electromagnetically operated actuators, are used in automotive technology for opening and closing the inlet and outlet valves of cylinders of diesel and/or gasoline engines, respectively, which introduce the fuel mixture into the combustion chamber and guide the combusted end products out of the combustion chamber. The time of opening and closing the valves must here be selected such that the internal combustion engine converts the thermal energy generated as effectively as possible into motor force. This occurs by the valve control or the valve drive. This is understood as the mechanism in which a displacement engine controls the valves and thus the charge alteration by opening and closing the inlet and the outlet valves. In general the valve is here opened by a camshaft via a tappet, a cam follower, or a rocker. The valves are closed by coil springs, sometimes by torsion springs, gas springs, or via a closing cam in a positively controlled fashion. The camshaft is here driven by the crankshaft of the motor.

With the constant further development of electric components and considerably supported by the continuously rising demands for reducing fuel consumption while increasing efficiency of the internal combustion machine, the electrification of motor vehicles has become decisively more important in recent years. For example, optimizing the control times of valve controls could yield considerable progress. The camshaft adjustment serves the purpose to adjust the most beneficial valve control times for the respective motor for the operating conditions idling, maximum power or torque, as well as exhaust gas recirculation. Accordingly, a respective technological change has also occurred in the camshaft adjusters.

Such actuator devices are known e.g. from DE 102 40 774 A1 and used for different applications, particularly also for the camshaft adjustment of motor vehicles. The general principle of this actuator device of prior art includes that a piston is used as an actuator, which shows at the end an engagement area for the intended adjustment tasks, and is guided in a housing and, against the force of a return spring, can be moved out of the housing via an actuator device provided in said housing and operating electromagnetically.

DE 10 2007 024 600 A1 discloses an actuator device with an actuator pin that is displaceable between an inserted holding position and an extended operating position in order to adjust a machine part that comprises a displacement groove cooperating with the actuator pin in its operating position, returns the actuator pin back into its default position, and which is embodied particularly as a cam part of the stroke-variable valve drive of an internal combustion engine arranged torque-proof and longitudinally displaceable. This shall generate an actuator device, which is designed radially as small as possible, and is fixed in reference to the displacement groove in a default position sufficiently free from engagement.

DE 10 2011 078 525 A1 discloses a sliding cam system with a bi-stable actuator device. In this actuator device the pressure spring is supported at the latching unit such that a support spring engages an actuator pin opposite the direction of the pressure spring, which rests on the guiding sleeve or a part connected thereto, with the pressure and support spring forming with the latching device a bi-stable arrangement of the actuator pin, with here the triggering of the bi-stable arrangement occurring by an electromagnetic unit. With such an embodiment it can be achieved that the projection of the actuator pin is initially triggered by the electromagnetic unit, namely to such an extent that the tipping point of the bi-stable arrangement of the actuator pin is reached, and the latching device is released so that the pressure spring then completely assumes the projection of the actuator pin into the displacement groove. This way, only a relatively low electromagnetic force is required for compressing the support spring. The pressure spring assumes the rapid projection of the actuator pin. In this device a pair of mobile tappets, parallel to each other, is pushed downwards by a single actuator, which is connected to a tipping unit. This way, either one tappet or the other tappet can engage the guide groove, for example a slide camshaft. In such devices it shows, however, that the spring-loaded tappets can easily cant or tilt in their guide sockets so that a secure operation of such an actuator element cannot be ensured. In particular, when tappets designed in this fashion engage alternatingly the grooves of slide cam systems, frequently such malfunctions occur, at least at one of the tappets.

The objective of the present invention is therefore to avoid such malfunctions and the disadvantages connected to actuator devices of prior art. This objective is attained in an actuator device with the features as described herein.

BRIEF SUMMARY OF THE INVENTION

In a preferred embodiment, an actuator device (1) comprising a first tappet (2) and a second tappet (4), with the first tappet (2) being arranged in a displaceable fashion in a first guide sleeve (6) and the second tappet (4) in a second guide sleeve (8), with the first tappet (2) being surrounded at least sectionally along its longitudinal axis by a first return spring (22) and the second tappet (4) at least sectionally along its longitudinal axis by a second return spring (26), and with the two guide sleeves (6, 8) being arranged at a fixed distance from each other, characterized in that the first return spring (22) represents a coil spring wound in the left direction and the second return spring (26) represents a coil spring wound in the right direction.

In another preferred embodiment, an actuator device (1) as described herein, characterized in that the coil springs (22, 26) are embodied as springs made from a fiberglass-reinforced synthetic material.

In another preferred embodiment, an actuator device (1) as described herein, characterized in that the coil springs (22, 26) comprise at each of their ends respectively at least two end windings abutting each other.

In another preferred embodiment, an actuator device (1) as described herein, characterized in that the coil spring (22) wound in the left direction or the coil spring (26) wound in the right direction comprise at least at one of their two ends three end windings abutting each other.

In another preferred embodiment, an actuator device (1) as described herein, characterized in that at least one end of each coil spring (22, 26) is embodied in an enhanced fashion.

In another preferred embodiment, an actuator device (1) as described herein, comprising a first actuator (28) and a second actuator (30), characterized in that the first actuator (28) is arranged in reference to the first tappet (2) such that it is effectively connected to the front end of the first tappet (2) and the second actuator (20) is arranged in reference to the second tappet (4) such that it is effectively connected to the front end of the second tappet (4).

In another preferred embodiment, an actuator device (1) as described herein, characterized in that the actuators (28, 30) are embodied in a rod-shaped fashion and are guided in a mobile fashion along the direction of their respective longitudinal axes.

In another preferred embodiment, an actuator device (1) as described herein, characterized in that the actuators (28, 30) can be operated magnetically and are preferably surrounded by actuator coils.

In another preferred embodiment, an actuator device (1) as described herein, characterized in that the tappets (2, 4) are embodied in a rod-shaped fashion, preferably cylindrically, and respectively show a longitudinal axis, a front end with respectively a widened embodied tappet head (12, 16), and a rear end.

In another preferred embodiment, an actuator device (1) as described herein, characterized in that the return springs (22, 26) are embodied as pressure springs, with each return spring (22, 26) being supported in and/or at the guide sleeve (6, 8), in and/or at which it is arranged, and at the tappet head (12, 16) of the tappet (2, 4) it surrounds.

In another preferred embodiment, an actuator device (1) as described herein, comprising a camshaft with grooves, which are arranged extending around the axis of rotation of the camshaft, characterized in that the rear ends of the tappets (2, 4) are embodied and arranged in reference to the camshaft such that at least a rear end of one of the two tappets (2, 4) engages a groove of the camshaft, when the return spring (22, 26) arranged about one tappet (2, 4) is compressed, and the one tappet (2, 4) is moved in reference to the guide sleeve (6, 8) in which it is guided in the direction to the camshaft.

In another preferred embodiment, an actuator device (1) as described herein, characterized in that the camshaft represents a slide camshaft and one cam is arranged at least sectionally diagonally in reference to the axis of rotation of the camshaft on the surface of the camshaft extending around the camshaft.

In another preferred embodiment, an actuator device (1) as described herein, characterized in that the longitudinal axes of the guide sleeves (6, 8) and/or the tappets (2, 4) are aligned perpendicular to and in the direction of the axis of rotation of the camshaft.

In another preferred embodiment, an actuator device (1) as described herein, characterized in that the longitudinal axes of the guide sleeves (6, 8) and/or the tappets (2, 4) are arranged extending parallel in reference to each other.

In an alternate preferred embodiment, a motor vehicle comprising an actuator device (1) as described herein.

BRIEF DESCRIPTION OF THE DRAWINGS

FIG. 1 is a line drawing evidencing an example of the actuator device with two actuators in a sectional illustration.

DETAILED DESCRIPTION OF THE INVENTION

The actuator device according to the invention comprises a first and a second tappet, with the first tappet being arranged in a sliding fashion at least partially in a first guide sleeve and the second tappet at least partially in a second guide sleeve, with the first tappet, for example in and/or at the first guide sleeve, being surrounded at least sectionally along its longitudinal axis by a first return spring, embodied as a coil spring, and the second tappet, for example in and/or at the second guide sleeve, being surrounded at least sectionally along its longitudinal axis by a second return spring embodied as a coil spring, and with the guide sleeves being arranged at a fixed distance from each other. The tappets are here arranged in a displaceable fashion in the direction of their longitudinal axes back and forth in their respective guide sleeves.

According to the invention, the first return spring represents a coil spring wound in the left direction and the second return spring represents a coil spring wound in the right direction. It has surprisingly shown in experiments that, when a tappet engages in the guide groove, for example of a slide cam system, the tappet is subjected to a torque about its longitudinal axis in which it is arranged in a displaceable fashion in its guide sleeve, either towards the right or the left. This is caused by the fact that the tappet contacts an edge, for example a side wall of the groove, in which it is guided, and/or that the tappet is not perfectly resting in a plane-parallel fashion on the base of the guide groove. When now, for example, the camshaft, which comprises the guide groove, rotates and the tappet engages this guide groove, a torque is transferred to the tappet. This torque causes a torque being applied upon the return spring, which slightly enlarges or reduces the diameter thereof depending on the direction of rotation of the torque applied. When the respective return spring twists in the same direction as the coil spring subjected to the torque of the tappet, the diameter of the return spring can only become smaller. A dysfunction is then prevented. If the return spring, however, represents a coil spring wound in the opposite direction as the torque applied to the tappet, the diameter can increase by the torque applied thereon, which can lead to the return spring canting in its guide sleeve and preventing the tappet from returning into its default position. This leads to a malfunction which in turn results in an early malfunction of the actuator device. It has been shown that such an early malfunction can be avoided by using coil springs respectively for the tappets, with their direction of windings being the same as the direction of rotation of the respective tappet in the groove of the camshaft.

In case of guide sleeves arranged in pairs at a fixed distance from each other, each of which via actuators impacting them guiding a tappet in the direction of a common camshaft, it has been shown that the first tappet is the one, assuming it is subjected to torque about its longitudinal axis, always being impacted by torque in the counter-clockwise direction as soon as it engages the groove of the common camshaft, while the second tappet is the one which, assuming it is subjected to torque about its longitudinal axis, is always impacted by torque in the clockwise direction as soon as it engages the groove of the common camshaft. If now the return springs both represent springs wound in the clockwise direction or both in the counter-clockwise direction, here an early malfunction of the device occurs such that the tappet, with its torque being opposite the direction of the windings of its coil spring, cants early in the guide sleeve with its coil spring and in this way causes a malfunction.

The early dysfunction at the tappet, with its torque being opposite the direction of winding of its coil spring, usually occurs such that one end of the coil spring is clamped under the last spiral winding of the coil spring. The end of the coil spring comes therefore to rest between the last spiral winding of the coil spring and the tappet, considerably compromising the mobility of the tappet along its longitudinal axis. Preferably the two coil springs therefore have at least at one of their two ends, preferably at each of their two ends, though, respectively at least two end windings abutting each other, which even abut each other when the coil springs are not compressed. The two end windings prevent any widening of the spring in this area so that during operation the end of the coil spring between the coil spring and the tappet cannot be clamped.

A reason for the coil springs clamping may be in the end of the coil spring over time being ground off by the rotation of the tappet against the direction of the winding of the coil spring, reducing the elasticity of the material forming the coil spring at this point. When the material at the end of the coil spring is removed to a sufficient extent, even minor friction force between the tappet and the end of the coil spring can easily clamp the end of the coil spring between the last winding of the coil spring and the tappet. For this reason it is advantageous for the ends of the coil spring not to be ground down and the direction of winding of the coil spring to be the same as the direction of rotation of the tappet. Additionally, the springs may also be embodied such that they are enlarged at their ends, for example showing a compressed wire with an enlarged diameter.

In order to allow, for example, quickly distinguishing a coil spring wound in the left direction from a coil spring wound in the right direction so that during the assembly the correct coil spring is arranged about the correct tappet, either the coil spring wound in the left direction or the coil spring wound in the right direction comprise at least at one of their two ends three abutting end windings, while the respectively other coil spring shows at its ends a different number of abutting end windings.

The coil springs can be made from a metallic material. In another alternative embodiment the two coil springs are embodied as fiberglass-reinforced synthetic springs. Such springs are particularly elastic and show a particularly long life compared to metallic springs.

The actuator device may, for example, comprise a single actuator, which is effectively connected to a front end of both tappets. Alternatively it may also show a first and a second actuator, with the first actuator being effectively connected to a front end of the first tappet and the second actuator effectively connected to the front end of the second tappet. An actuator device with two actuators for two tappets can address one tappet separately from the other tappet, and allows this way a separate individual control of each tappet.

The actuators are preferably embodied in a rod-shaped fashion, particularly preferred cylindrically, and they are guided in a mobile fashion along their respective longitudinal axial directions.

Although the actuators can be operated mechanically, they are beneficially actuated magnetically or electromagnetically and preferably surrounded by respectively separate actuator coils. This way the actuators can be operated via simple electric control pulses, for example calculated by a computer program, in a targeted fashion such that an optimized pressure sequence is applied upon the tappets, which ensures that the internal combustion engine runs in the respectively optimized operating range.

The tappets are embodied such that they are rod-shaped, preferably cylindrical. They respectively show a longitudinal axis, a front end with a tappet head embodied in an enlarged fashion, and a rear end. The return springs, which move the tappets back into their default position, are advantageously embodied as pressure springs, with each return spring being supported at and/or in the guide sleeve, at and/or in which it is arranged, and the tappet head of the tappet it surrounds.

The actuator device described advantageously comprises a camshaft with grooves, which are arranged extending around the axis of rotation of the camshaft. The rear ends of the tappets are here embodied and arranged in reference to the camshaft such that at least one rear end of one of the tappets can engage or engages a groove of the camshaft when, for example by the fact that a force is applied upon the tappet head in the longitudinal direction of one of the tappets, the return spring arranged about said one tappet is compressed and said tappet is moved in reference to the guide sleeve, in which it is guided, in the direction towards the camshaft.

Preferably the camshaft is a slide camshaft and one groove is at least sectionally embodied diagonally in reference to the axis of rotation on the surface of the camshaft about said camshaft. In this context, diagonally represents that the tangential direction of extension of the groove is aligned at least sectionally not perpendicular to the axis of rotation of the camshaft. A slide camshaft, in which the camshaft can be displaced along its axis of rotation in a certain range back and forth, is advantageous in that by an appropriate embodiment and design of the shape of the groove on the camshaft the valve projections can be adjusted in reference to each other in a precisely and reproducible fashion, and this way an optimal functional range of the internal combustion engine can be selected.

In a particularly preferred embodiment the camshaft comprises a common groove for both tappets, which is arranged on the camshaft such that alternating either the first tappet or the second tappet can engage this one grove. This way, for several tappets only a single groove needs to be formed on the camshaft, which can simplify the production of the camshaft. Of course, it is also possible that each of the two tappets can engage a separate groove, for example each engaging a groove embodied diagonally in reference to the axis of rotation of the camshaft on the surface of said camshaft around the camshaft.

In a preferred embodiment of the actuator device, the longitudinal axes of the guide sleeves and/or the tappets are aligned perpendicular to and in the direction of the axis of rotation of the common camshaft. The longitudinal axes of the guide sleeves and/or the tappets can of course also be arranged aligned parallel to each other.

In the following, the actuator device according to the invention is explained in greater detail based on a concrete exemplary embodiment. The terms used in the following description, such as "top," "bottom," "left," "right" or the like refer to the exemplary embodiment and shall not be considered restricting in any way, not even when they relate to a preferred embodiment. The term "perpendicular" shall in this document refer to an angular range from 88 degrees to 92 degrees. The term "parallel" shall in this document include angular deviations of up to 2 degrees from the parallel.

A coil spring wound in the left direction shall represent in the following a coil spring wound in the direction in which, seen distanced from the observer, it winds in the counter-clockwise direction. A coil spring round in the right direction shall represent in the following a coil spring wound in the direction in which, seen distanced from the observer, it winds in the clockwise direction.

DETAILED DESCRIPTION OF THE FIGURES

FIG. 1 shows an actuator device 1 with a first tappet 2 and a second tappet 4. The first tappet 2 is arranged in a longitudinally displaceable fashion in a first guide sleeve 6. The second tappet 4 is arranged in a longitudinally displaceable fashion in a second guide sleeve 8. The two guide sleeves 6, 8 are arranged in a guide housing 10, at a fixed distance from each other. The first tappet 2 comprises a first tappet head 12 as well as a rear end 14 opposite the first tappet head 12. Similarly, the second tappet 4 comprises a second tappet head 16 as well as a rear end 18 opposite the second tappet head 16. A first return spring 22 rests between the first tappet head 2 and a first guide sleeve support 20 formed in the guide housing 10. A second return spring 26 rests between the second tappet head 16 and a second guide sleeve support 24 formed in the guide housing 10. The first return spring 22 is arranged around the first tappet 2. The second return spring 26 is arranged around the second tappet 4. A first actuator 28 is effectively connected to the first tappet head 12. A second actuator 30 is effectively connected to the second tappet head 16. An electrically actuated first actuator coil 32 is arranged around the first actuator 28. A second actuator coil 34 is arranged around the second actuator 30, also operated in an electric fashion.

When now a current flows through the first actuator coil 32, the first actuator 28 is pushed downwards upon the tappet head 12 and the tappet head 12 is moved downwards, guided axially in the first guide sleeve 6, until the rear end 14 of the first tappet 2 engages a groove of a camshaft (not shown). The camshaft (not shown) rotates here about an axis extending perpendicular to the direction of motion of the first tappet 2.

When now the tappet 2 contacts, for example, an edge of the groove of the camshaft in which it is guided, based on the friction force acting between the edge of the groove and the rear end 14 of the first tappet, here, for example, a torque is applied in the counter-clockwise direction, seen from the rear end 14 of the tappet 2 in the direction towards the first actuator 28 to the first tappet 2. The first tappet 2 is effectively connected, at least via friction forces, to the first return spring 22 and the first return spring 22 is effectively connected, at least also via friction forces at least at its lower end at which it rests on the guide sleeve 6, to the first guide sleeve 6. If now the first tappet 2 rotates in the first guide sleeve 6 in the counter-clockwise direction, seen from its rear end 14, it rotates in the direction of the windings of the first return spring 22, thus the left direction, so that the friction forces acting between the tappet 2 and the return spring 22 reduces differentially the diameter of the first return spring 22 such that the first tappet 2 in and/or at the first guide sleeve 6 cannot cant.

Due to the fact that the diameter of the first return spring 22 reduces differentially, the end of the return spring 22 cannot clamp between the first tappet 2 and the last winding of the return spring 22. Even if in this case the end of the return spring was ground down over time by the tappet 2 and the elasticity of the return spring was therefore reduced at this point, the end of the return spring would not be clamped between the first tappet 2 and the last winding of the return spring 22 because the direction of motion of the tappet 2 cannot move the end of the return spring in a direction opposite the direction of the windings of the return spring 22.

In the event the first return spring 22 represented is not a coil spring wound in the direction of rotation of the first tappet 2 but a coil spring wound opposite to the direction of motion of the first tappet 2, thus a coil spring wound in the right direction, here due to the friction between the first return spring 22 and the first tappet 2, the diameter of the first return spring 22 would increase differentially. By the relative rotary motion between the return spring 22 and the tappet 2, the end of the return spring 22 would gradually be ground down at its support area and thus become thinner. This reduces the elasticity of the end of the return spring 22 and the end of the return spring 22 can be entrained by the tappet 2 due to the direction of motion of the tappet 2 opposite the direction of the windings of the coil spring 22 and clamp between the tappet 2 and the last winding of the return spring 22. The first return spring 22 could then no longer move back the first tappet 2 into its original default position as soon as the actuator 28 no longer presses upon the first tappet head 12, which triggers a malfunction of the device.

The second return spring 26 is a coil spring wound in the right direction. When now the second actuator 30 presses upon the second tappet head 16, the second tappet 4 is moved downwards in the second guide sleeve 8 until it engages a groove or another groove of the camshaft. The rotation of the camshaft about an axis perpendicular to the direction of motion of the second tappet 4 results in that the second tappet 4 is subjected to a torque in the right direction. Due to the fact that the second return spring 26 also represents a return spring which shows the same direction, thus a coil spring wound in the right direction, it can be reliably prevented that the second tappet 4 clamps or cants in the second guide sleeve 8.

LIST OF REFERENCE NUMBERS 1 actuator device
2 first tappet
4 second tappet 6 first guide sleeve
8 second guide sleeve
10 guide housing
12 first tappet head; front end of the first tappet
14 rear end of the first tappet
16 second tappet head; front end of the second tappet
18 rear end of the second tappet
20 first guide sleeve support
22 first return spring
24 second guide sleeve support
26 second return spring
28 first actuator
30 second actuator
32 first actuator coil
34 second actuator coil The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. An actuator device comprising a first tappet and a second tappet, with the first tappet being arranged in a displaceable fashion in a first guide sleeve and the second tappet in a second guide sleeve, with the first tappet being surrounded at least sectionally along its longitudinal axis by a first return spring and the second tappet at least sectionally along its longitudinal axis by a second return spring, and with the two guide sleeves being arranged at a fixed distance from each other, wherein the first return spring represents a coil spring wound in the left direction and the second return spring represents a coil spring wound in the right direction.

2. The actuator device according to claim 1, wherein the coil springs are embodied as springs made from a fiberglass-reinforced synthetic material.

3. The actuator device according to claim 1, wherein the coil springs comprise at each of their ends respectively at least two end windings abutting each other.

4. The actuator device according to claim 3, wherein the coil spring wound in the left direction or the coil spring wound in the right direction comprise at least at one of their two ends three end windings abutting each other.

5. The actuator device according to claim 3, wherein at least one end of each coil spring is embodied in an enhanced fashion.

6. The actuator device according to claim 1, further comprising a first actuator and a second actuator, wherein the first actuator is arranged in reference to the first tappet such that it is effectively connected to the front end of the first tappet and the second actuator is arranged in reference to the second tappet such that it is effectively connected to the front end of the second tappet.

7. The actuator device according to claim 6, wherein the actuators are embodied in a rod-shaped fashion and are guided in a mobile fashion along the direction of their respective longitudinal axes.

8. The actuator device according to claim 6, wherein the actuators can be operated magnetically and are surrounded by actuator coils.

9. The actuator device according to claim 1, wherein the tappets are embodied in a cylindrical rod-shaped fashion and respectively show a longitudinal axis, a front end with respectively a widened embodied tappet head, and a rear end.

10. The actuator device according to claim 1, wherein the return springs are embodied as pressure springs, with each return spring being supported in and/or at the guide sleeve, in and/or at which it is arranged, and at the tappet head of the tappet surrounds.

11. The actuator device according to claim 1, further comprising a camshaft with grooves, which are arranged extending around the axis of rotation of the camshaft, wherein the rear ends of the tappets are embodied and arranged in reference to the camshaft such that at least a rear end of one of the two tappets engages a groove of the camshaft, when the return spring arranged about one tappet is compressed, and the one tappet is moved in reference to the guide sleeve in which it is guided in the direction to the camshaft.

12. The actuator device according to claim 11, wherein the camshaft represents a slide camshaft and one cam is arranged at least sectionally diagonally in reference to the axis of rotation of the camshaft on the surface of the camshaft extending around the camshaft.

13. The actuator device according to claim 11, wherein the longitudinal axes of the guide sleeves and/or the tappets are aligned perpendicular to and in the direction of the axis of rotation of the camshaft.

14. The actuator device according to claim 1, wherein the longitudinal axes of the guide sleeves and/or the tappets are arranged extending parallel in reference to each other.

15. A motor vehicle comprising an actuator device according to claim 1.

* * * * *